July 22, 1958 W. J. COULTAS 2,843,990
HAY CONDITIONER ROLL MOUNTING AND ADJUSTMENT MECHANISM
Filed March 23, 1956

INVENTOR.
W. J. COULTAS

United States Patent Office

2,843,990
Patented July 22, 1958

2,843,990

HAY CONDITIONER ROLL MOUNTING AND ADJUSTMENT MECHANISM

Wilbur J. Coultas, Moline, Ill., assignor to Deere & Company, Moline, Ill., a corporation of Illinois Application March 23, 1956, Serial No. 573,373

11 Claims. (Cl. 56—1)

This invention relates to a hay conditioner and more particularly to means for mounting the rolls for relative adjustment.

A typical hay conditioner to which the present invention is particularly applicable is disclosed in the U. S. patent to Cunningham 2,711,622, in which patent a hay conditioner of the corrugated or bladed roll type is shown as having a pair of cooperative rolls disposed transversely to the line of advance of the machine. As the machine is drawn over a field of previously harvested crops, the crops are picked up and passed through the cooperative rolls for return to the ground behind the machine, the passage of the crops through the rolls causing stretching, cracking and bruising of the stems of the crops so as to accelerate the curing thereof.

Since the rolls are corrugated or bladed, as distinguished from peripherally smooth rolls, the effectiveness of the cooperative relationship between the rolls depends in part upon the force acting to move one roll into mesh or engagement with the other. This force is usually applied by one or more biasing means and it is desirable that this means be adjustable. In many instances, particularly in extremely heavy swaths, the rolls will become clogged by the crops, causing the slip clutch in the power drive to slip until the clogged condition is removed. Removal of the clogged condition may be accomplished by separating the rolls, but it has heretofore been difficult to accomplish this, because the only releasable means available was the adjusting means on the biasing springs. According to the present invention, this difficulty is eliminated by a quickly releasable reaction member associated with each biasing means, which member may be moved between first and second positions to load and unload the biasing spring. It is a feature of the invention to provide an improved mechanism of the character described which may be readily incorporated in hay conditioners of existing designs. The invention further features an enclosed biasing spring structure in association with the quickly releasable reaction member. Still further, the invention has for an object the provision of improved means for mounting the adjustable roll, this means preferably including a pair of spaced apart carriers journaling opposite ends of the roll and the carriers themselves being under control of the adjusting and release mechanism.

The foregoing and other important objects and desirable features inherent in and encompassed by the invention will become apparent as a preferred embodiment thereof is disclosed in detail in the ensuing specification and accompanying sheet of drawings, the several figures of which will be described immediately below.

Figure 1:
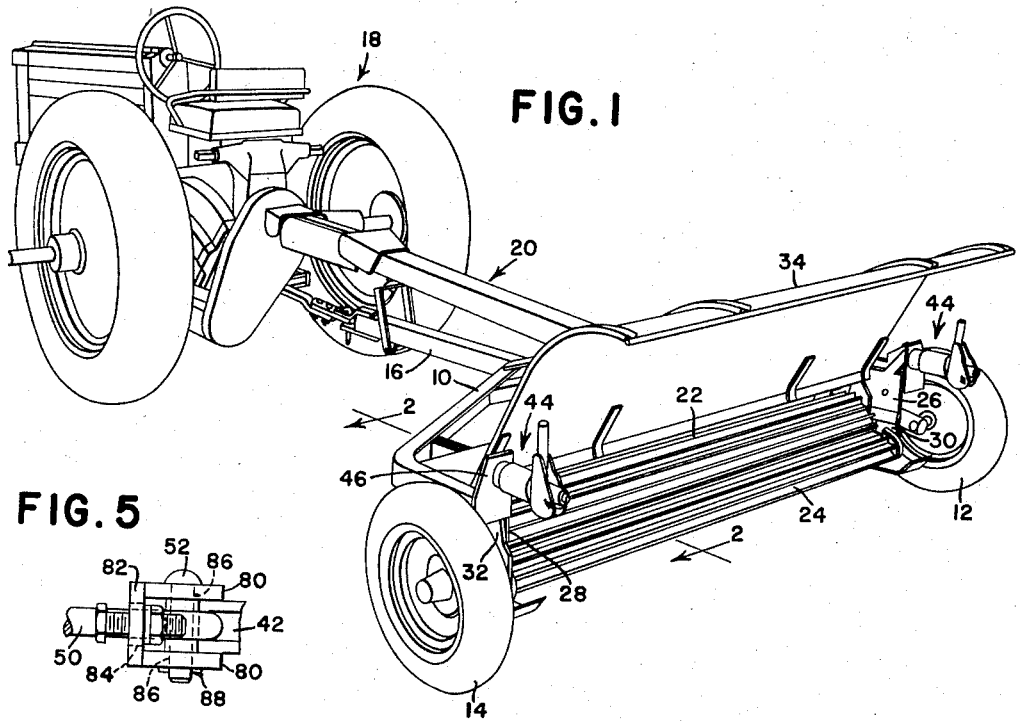
Fig. 1 is a perspective of a tractor and a trailing hay conditioner of the character noted in the above patent.

The type of hay conditioner chosen for the purposes of illustration comprises a main frame 10 carried on right and left hand wheels 12 and 14 and including a draft tongue 16 by means of which the machine may be connected to a draft vehicle such as a tractor indicated in its entirety by the numeral 18. A power take off and propeller shaft assembly, not shown but shielded within safety shielding 20, drives first and second conditioner rolls 22 and 24, respectively, in the directions of the arrows shown in Fig. 2. The general theory of operation is that as the conditioner is drawn forwardly over the field by the tractor, previously harvested crops, lying on the ground in swaths, will be picked up by the rolls 22 and 24 and will pass upwardly and rearwardly between the rolls to be crushed, bruised, etc., and will be returned to the ground behind the machine.

The roll 22 lies horizontally and extends transversely between and is journaled at its opposite ends respectively in a pair of horizozntally spaced supports 26 and 28. The roll 22, as well as the roll 24, is of corrugated or bladed construction, and the teeth of the rolls mesh or engage during normal operation. The roll 24 lies, of course, parallel to the roll 22 and is journaled at its opposite ends respectively in a pair of carriers 30 and 32. In the particular type of machine shown, an upwardly and rearwardly inclined shield 34 is provided to minimize the height of the crops as they are discharged rearwardly and upwardly, thereby preventing the crops from being adversely affected by the wind.

Since the carrier 32 is shown in greater detail (Figs. 2, 3 and 4), it will be described to the exclusion of detailed reference to the carrier 30, it being understood, however, that the carriers are identical or at least symmetrical. Hence, the description of one will suffice for the other.

The carrier 32 has a lower end 36 which journals the proximate end of the second or smaller roll 24. The carrier has in addition an intermediate portion 38 pivoted at 40 to the support 28, and further includes a terminal upper end 42. The pivot 40 is effected in any suitable manner and is spaced upwardly from and parallel to the roll 24. The carriers 30 and 32 are therefore swingable back and forth in first and second opposite directions for moving the roll 24 bodily respectively toward or away from the roll 22, accordingly enabling variations between the mesh or interengagement of the roll teeth or blades.

Figure 2:
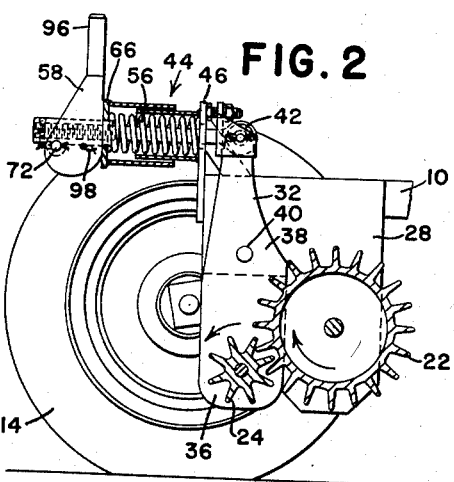
Fig. 2 is an enlarged fragmentary section as seen substantially along the line 2—2 of Fig. 1.
Figure 3:
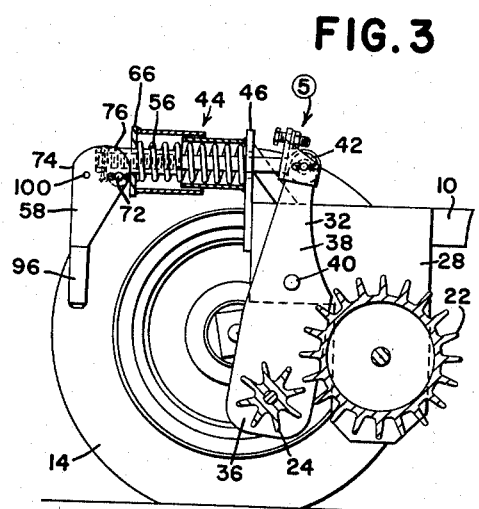
Fig. 3 is a view similar to Fig. 2 but showing a different relationship between the rolls.
Figure 4:
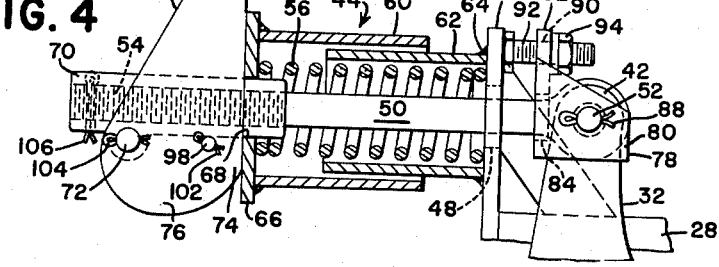
Fig. 4 is an enlarged fragmentary section of the roll control mechanism.

During normal operation, it is desirable that the roll 24 have at least some mesh or engagement with the roll 22 and for this purpose, the carriers 30 and 32 are biased to achieve movement of the carriers in the aforesaid first direction, whereby the roll 24 is urged bodily toward the roll 22. A representative biasing means, peculiar to both sides of the machine, is indicated in its entirety by the numeral 44 and is best shown in Figs. 2, 3 and 4. Again, the left hand structure is shown in detail and will be described without reference to the right hand structure, except to note that the two are identical and what is said about one applies to the other.

The support 28 has rigidly attached thereto an upstanding member or bracket 46 apertured at 48 in general fore-and-aft alinement with the upper terminal end 42 of the carrier 32. A link or rod 50 is pivotally connected by a transverse pin 52 to said upper terminal end and extends rearwardly or away from the carrier, passing loosely through the bracket aperture 48 and having a rear or terminal end provided with screw threads as at 54. The biasing means includes a coiled compression spring 56 interposed between the bracket 46 and a reaction member 58 and coaxially encircling the link or rod 50. The spring is concentrically encircled by a pair of telescopic enclosures in the form of tubular members 60 and 62, the former being preferably welded at 64 at one end to the rear face of the bracket 46 and the latter including a radial end wall or disk 66 which is apertured at 68 to receive a substantially cylindrical internally threaded element 70 that affords part of the means for connecting the reaction member 58 to the link or rod 50. Hence, the spring 56 acts at one end against the bracket 46 and reacts against the enclosure end wall or disk 66 which, in turn, as will presently appear, acts against the reaction member 58.

Figure 5:
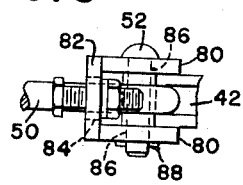
Fig. 5 is an enlarged plan view of the structure designated by the encircled numeral 5 in Fig. 3.

As described above, the element 70 is threaded onto the threaded end 54 of the rod or link 50. The reaction member 58 is pivotally connected to the element 70 by means of a pin 72 on an axis transverse to the length of the link. The reaction member is in the form of a cam having high and low portions 74 and 76, respectively. Hence, the reaction member is bi-positionable; that is, it is carried by the link 50, via the element 70, for movement between first and second positions, the first position being shown in Figs. 2 and 4 and the second position being shown in Fig. 3. These positions are, in effect, spaced respectively at different distances from the upper end of the carrier 32. In detail, when the cam or reaction member 58 occupies its first position (Figs. 2 and 4), the high portion 74 engages the rear face of the end wall or disk 66 of the rear enclosure 60, thereby compressing and loading the spring between said disk and the bracket 46, the spring therefore exerting a rearward force on the link 50 which tends to swing the carrier 32 in a counterclockwise direction about its pivot 40, thereby urging the roll 24 into tighter engagement with the cooperating first or larger roll 22. The ability of the roll 24 to move toward the roll 22 is limited by means of a stop shown best in Figs. 4 and 5. This stop comprises a U-shaped element 78 having a pair of ears 80 and a bight 82. The bight is apertured at 84 to loosely receive the proximate portion of the rod or link 50; and the ears 80 are apertured in transverse alinement at 86 to receive the connecting pin 52 at the upper end 42 of the carrier 32. A cotter 88 retains the pin 52 against displacement. The bight 82 has, at its upper portion, a threaded aperture 90 into which an adjusting device in the form of a screw 92 is threaded, the head of the screw being adapted to abut the upper front portion of the bracket 46. A lock nut 94 is threaded on the screw at the front side of the bight 82 for securing the adjusted position of the screw.

As shown in Fig. 3, the cam or reaction member 58 may be swung to its second or released position, this achievement being facilitated by the provision of a short handle 96 on the cam which is adapted to receive a pipe or similar tubular member for increasing the mechanical advantage required to release the load on the spring 56. When the cam 58 is in its second position, its low portion 76, rather than its high portion 74, is presented to the end wall or disk 66 of the rear enclosure 60. Hence, the distance between the reaction member 58 and the bracket 46 is increased, with the result that the spring 56 may elongate or become unloaded, thereby enabling free relative swinging of the carrier 32 in a clockwise direction about its pivot 40 and consequently enabling rearward displacement of the roll 24 relative to the roll 22 in order to relieve any clogged condition that may occur during operation.

After the difficulty has been overcome, the cam 58 may be returned to its first or normal position (Figs. 2 and 4). A particular advantage of the arrangement is that the spring 56 may be loaded and unloaded without varying the compression load thereon, once adjusted. In other words, the spring 56 need not be readjusted each time it is released or unloaded. This result flows from the mounting of the cam 58 on the link, via the element 70, for swinging about the pivot axis at 72. In order to avoid accidental release of the cam 58, which might occur after prolonged use has created wear in the parts, a removable locking pin may be provided at 98, which pin passes crosswise beneath the element 70 ahead of the pivot pin 72, the cam being of bifurcated construction (Fig. 1) so as to straddle the element 70. The opening through which the pin 98 is insertable and removable is visible at 100 in Fig. 3. The pin 98 may be releasably retained by releasable means such as a cotter 102. The pin 72 is normally permanently retained, as by a cotter 104.

It is a further feature of the invention to provide for deliberate adjustment of the load on the spring 56. This is accomplished via the threaded connection between the element 70 and the threads 54 on the rear or terminal end of the link or rod 50. Normally this element 70 is pinned to the rod by releasable means in the form of a cotter 106. However, this cotter can be removed and the cam 58, together with the element 70, may be rotated about the axis of the link 50 to propel or repel the rear enclosure 60 and thereby to adjust the load on the spring 56. Once the adjusting has been accomplished, it may be retained by replacing the cotter 106.

The telescopic enclosures 60 and 62 prevent the entrance of foreign material to the spring 56 and therefore the spring 56 is kept in working order at all times. The stop at 92 may be adjusted to suit a particular set of circumstances, as may the loading on the spring 56 in the manner previously described.

Other features and characteristics not categorically enumerated herein will undoubtedly occur to those versed in the art, as will many modifications and alterations in the preferred embodiment of the invention, all of which may be achieved without departure from the spirit and scope of the invention.

What is claimed is:

1. In a hay conditioner having a main frame including a pair of horizontally spaced apart supports: roll-mounting and adjusting mechanism, comprising a first horizontal roll journalled at opposite ends on the supports; a second roll closely paralleling the first roll and having opposite ends respectively adjacent the supports; a pair of upright carriers respectively adjacent to the supports, each carrier having a lower end journaling the adjacent end of the second roll, an intermediate portion pivoted on the adjacent support on a transverse axis parallel to and above the second roll, and a terminal upper end, said carriers being selectively swingable in opposite operative and release directions about said axis to move the second roll respectively toward and away from the first roll; a pair of links connected respectively to the upper ends of the carriers and extending in parallelism away from the carriers; a bracket rigid on each support and having an aperture through which the associated link extends to a terminal end beyond said bracket; a pair of coiled compression springs carried respectively by the links between the brackets and the terminal ends of the links; and a pair of reaction members carried respectively by the terminal ends of the links, each spring being normally engaged by and confined between a bracket and the associated reaction member each member being movably carried by its link for selective positioning to normally compress and load the associated spring between said member and the associated bracket for biasing the associated carrier to swing in its aforesaid operative direction or to unload said spring to free said carrier for swinging in its release direction.

2. The invention defined in claim 1, including: a stop on the upper end of each carrier engageable with the associated bracket to limit movement of the associated carrier in said operative direction.

3. The invention defined in claim 2, in which: each link is connected to the upper end of its carrier by a pin transverse to the length of said link; and each stop comprises a U-shaped element having a pair of apertured ears receiving the associated pin and an apertured bight receiving the associated link at the carrier side of the associated bracket.

4. The invention defined in claim 3, in which: the bight of each stop carries an adjustable device engageable with the associated bracket so as to afford adjustment for said stop.

5. The invention defined in claim 1, in which: the terminal end of each link is threaded; a threaded element is carried by each link to afford a threaded connection by means of which the element is adjustable lengthwise of its link; and the reaction members are pivoted respectively to the elements on axes transverse to the lengths of the respective links, each reaction member being in the form of a cam having high and low portions respectively effective to load and unload the respective spring according to positioning of said cam about said pivotal connection, each cam being rotatable with its element via the associated threaded connection for varying the load on the associated spring.

6. The invention defined in claim 1, in which: each reaction member is in the form of a cam having a pivotal connection to the terminal end of the respective link on an axis transverse to said link, said cam including high and low portions respectively effective to load and unload the respective spring according to positioning of said cam about said pivotal connection.

7. The invention defined in claim 1, including: a pair of telescopic enclosure members concentrically surrounding each spring, one enclosure member being proximate to the associated bracket and the other proximate to the associated reaction member.

8. In a hay conditioner having a main frame including a pair of horizontally spaced apart supports: roll-mounting and adjusting mechanism, comprising a first horizontal roll journalled at opposite ends on the supports; a second roll closely paralleling the first roll and having opposite ends respectively adjacent the supports; a pair of upright carriers respectively adjacent to the supports, each carrier having a lower end journaling the adjacent end of the second roll, an intermediate portion pivoted on the adjacent support on a transverse axis parallel to and above the second roll, and a terminal upper end, said carriers being selectively swingable in opposite operative and release directions about said axis to move the second roll respectively toward and away from the first roll; a pair of biasing means acting respectively on the upper ends of the carriers; and a pair of reaction members respectively engaging the biasing means and carried respectively on the supports for movement between first and second positions spaced respectively at different distances from the upper ends of the carriers, said members in their first positions engaging and loading the respective biasing means to swing the carriers in the aforesaid operative direction, and said members in their second position relieving the loads on the respective biasing means for facilitating swinging of the carriers in the aforesaid release direction.

9. In a hay conditioner having a main frame including a pair of horizontally spaced apart supports: roll-mounting and adjusting mechanism, comprising a first horizontal roll journalled at opposite ends on the supports; a second roll closely paralleling the first roll and having opposite ends respectively adjacent the supports; a pair of upright carriers respectively adjacent to the supports, each carrier having a lower end journaling the adjacent end of the second roll, an intermediate portion pivoted on the adjacent support on a transverse axis parallel to and above the second roll, and a terminal upper end, said carriers being selectively swingable in opposite operative and release directions about said axis to move the second roll respectively toward and away from the first roll; a pair of rods connected respectively to the upper ends of the carriers and extending in parallelism away from the carriers, each rod having a remote end externally threaded; a bracket rigid on each support and having an aperture through which the associated rod extends, the remote end of said rod lying beyond said bracket; a pair of coiled compression springs carried respectively by the rods between the brackets and the terminal ends of the rods and respectively engaging the brackets; a threaded element carried on the threaded end of each rod to afford a threaded connection by means of which the element is adjustable lengthwise of its rod; a pair of reaction members, one pivoted to each element on an axis transverse to the length of the respective rod, each reaction member being in the form of a cam having a high portion normally effective to engage and load the respective spring to bias the respective carrier in its operative direction, and each cam having a low portion operative upon swinging of said cam about said pivotal connection to unload the respective spring for facilitating swinging of the respective carrier in its release direction; a releasable means locking the element against rotation; and a second releasable means locking each cam against swinging.

10. In a hay conditioner having a main frame including a pair of horizontally spaced apart supports: roll-mounting and adjusting mechanism, comprising a first horizontal roll journalled at opposite ends on the supports; a second roll closely paralleling the first roll and having opposite ends respectively adjacent the supports; a pair of upright carriers respectively adjacent to the supports, each carrier having a lower end journaling the adjacent end of the second roll, an intermediate portion pivoted on the adjacent support on a transverse axis parallel to and above the second roll, and a terminal upper end, said carriers being selectively swingable in opposite operative and release directions about said axis to move the second roll respectively toward and away from the first roll; a pair of links connected respectively to the upper ends of the carriers and extending in parallelism away from the carriers; a bracket rigid on each support and having an aperture through which the associated link extends to a terminal end beyond said bracket; a pair of coiled compression springs carried respectively by the links between the brackets and the terminal ends of the links; and a pair of cams, one carried by the terminal end of each link on a pivotal connection transverse to the length of said link each spring being normally engaged by and confined between a bracket and an associated cam, each cam having high and low portions selectively presentable to the associated spring according to positioning of said cam about said pivotal connection, said high portion serving to compress and load said spring between said cam and the associated bracket for biasing the associated carrier to swing in its aforesaid operative direction, said low portion, upon swinging of said cam, serving to unload said spring to free said carrier for swinging in its release direction.

11. In a hay conditioner having a main frame including a pair of horizontally spaced apart supports: roll-mounting and adjusting mechanism, comprising a first horizontal roll journalled at opposite ends on the supports; a second roll closely paralleling the first roll and having opposite ends respectively adjacent the supports; a pair of carriers journaling the second roll respectively at its opposite ends; means mounting the carriers respectively on the supports for movement in first and second opposite directions to carry the second roll respectively toward and away from the first roll; a pair of biasing means acting respectively on the carriers, each biasing means comprising a coiled compression spring and each carrier having a rod connected thereto and extending axially through the associated spring to an end remote from the associated carrier, and each support having a portion rigid thereon and abutting the spring adjacent to the associated carrier; and a pair of reaction members respectively associated with the springs for movement between first and second positions spaced respectively at different distances from the carriers, said members in their first positions engaging and loading the respective biasing means to move the carriers in the aforesaid first direction, and said members in their second position relieving the loads on the respective biasing means for facilitating movement of the carriers in the foresaid second direction, each reaction member comprising a cap engaging the end of the spring adjacent to the remote end of the rod and a cam having a pivotal connection to said end of said rod on an axis transverse to said rod, said cam including high and low portions respectively effective to load and unload the respective spring according to positioning of said cam about said pivotal connection.

References Cited in the file of this patent

UNITED STATES PATENTS

| | | |
|---|---|---|
| 1,358,302 | Ellis | Nov. 9, 1920 |
| 2,345,715 | Reed | Apr. 4, 1944 |
| 2,711,622 | Cunningham | June 28, 1955 |